Figure 1:
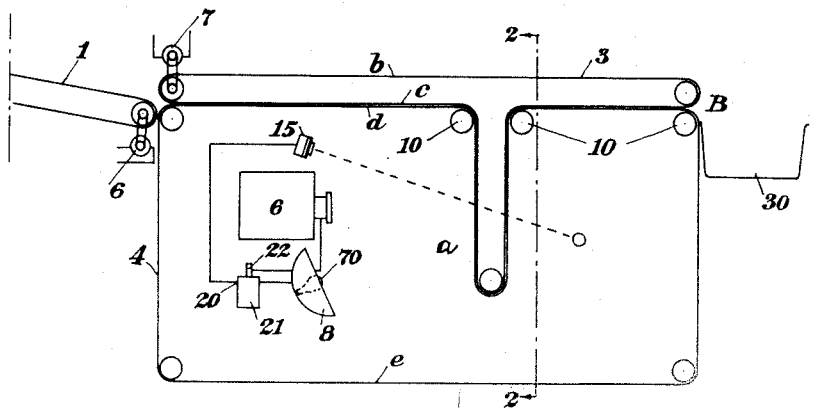

March 26, 1940.   F. D. POOLEY, JR   2,194,808
MACHINE FOR PHOTOGRAPHING DOCUMENTS
Filed Sept. 14, 1938

INVENTOR.
Frank D. Pooley, Jr.,
BY Mark W. Collet
ATTORNEY

Patented Mar. 26, 1940

2,194,808

UNITED STATES PATENT OFFICE 2,194,808

MACHINE FOR PHOTOGRAPHING DOCUMENTS

Frank D. Pooley, Jr., Philadelphia, Pa.

Application September 14, 1938, Serial No. 229,837

6 Claims. (Cl. 88—24)

My invention has to do with automatically and successively photographing detached documents, a very common example of which is the photographing successively of the checks taken in by a bank. The device is particularly fitted for photographing both sides of the check or other document.

Devices for this purpose are at present on the market, but they are large, and expensive, and generally complicated.

My device utilizes a photo-electric relay controlled by cutting off periodically its activating illumination, by the successive documents passing in front of it, and interfering with its actuating beam. This photo-electric relay operates a second relay that causes the operation of a shutter or other device, of a camera facing the path traversed by the document, and focussed and directed so that it will "take" the picture of the document by a snap shot, while the document is in front of the camera. An electric current, controlled by the photo-electric relay, furnishes the energy to operate the camera, and cause it to produce the snap shot. The electric devices in a general form are old individually, but not in the combination they are used in my device. The documents, in my device, are carried by transparent belting, comprising two belts that during the parts of their travel comprising their passage in front of the camera lie against each other, and hold the documents between them. The picture is taken through one or more transparent belts. These belts are arranged not only to carry the documents in front of the camera but also to interpose them between the photo-electric cell and the beam of light that controls them so that the documents will interrupt the passage of the beam from the light that actuates the cell to the photo-electric cell, when the documents are in front of the camera, in a favorable position for a "snap-shot". This interruption of the beam of light causes the cell to operate its relay and thus set in action the other devices by which the photographing is operated. These devices include means for causing the camera to take a picture only when the document is held by the belts in front of it. The exposure must be brief, because the transparent belt must travel at a good speed.

As the documents must be photographed usually on both of their sides, I arrange a return system of the transparent belting traveling oppositely to the portions described above, by which the document is carried between and by a pair of transparent belts in the opposite direction to that traveled by the first pair of belts. One pair of belts only need be used and may be carried over a pulley that reverses their travel. The device is provided with the needful motors, and convenient document carrying belting that leads the document to the bite of the pair of transparent belts, but their particular construction does not, in general, concern my invention. The particular form of camera and of the photoelectric relay, are not limitations on my invention. These devices are well known and will not be described in detail in my description of the best form of my device of which I am at present aware. Portions of my device may be used without using other parts, and I wish it to be understood that I do not limit my invention to cases where all parts of it are used.

Figure 2:
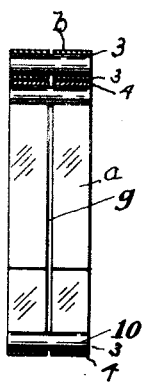
Figure 3:
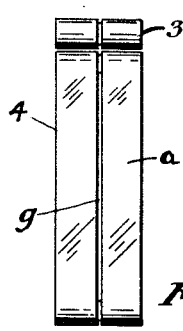
Figure 4:
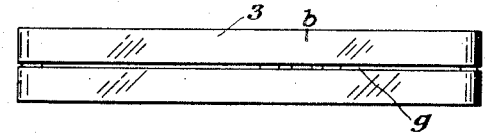
Figure 5:
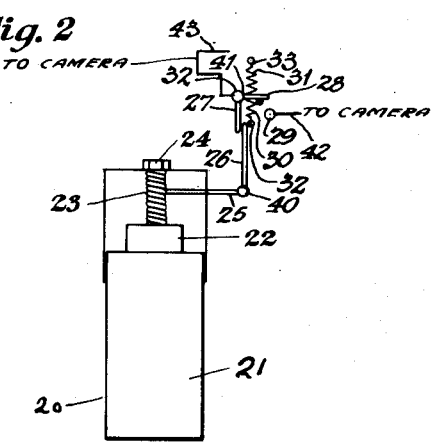
Figure 6:
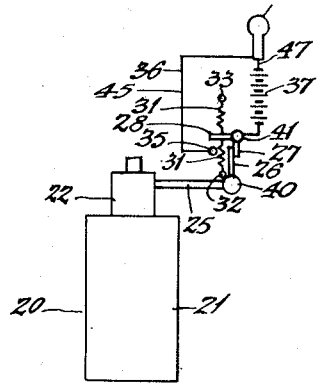

Describing now my machine in what I believe is its best form:

Fig. 1 is a schematic elevation of my device. Fig. 2 is a section on line 2—2 of Fig. 1. Fig. 3 is a side elevation of the transparent belts. Fig. 4 is a top view of the same, and Fig. 5 is a detail showing the solenoid used in connection with the circuit from the relay to operate the means for causing the camera to take the snap shot, and Fig. 6 is a detail showing a modification of these means.

The traveling belt 1 extends from any convenient location to the bite of the transparent belts 3 and 4, and on it may be placed the documents to be photographed. It travels at a less speed than the transparent flexible belts 3 and 4, so as to secure a spacing of the documents from each other between the transparent belts. These belts are all driven by suitable motors, preferably electric motors 6 and 7, the particular form of which forms no part of my invention or limitation on it, and are indicated merely schematically. The transparent, document carrying belts 3 and 4 are arranged to hold the documents between them and while still holding them to bring them into position where they will be positioned in front of the camera.

I have shown these belts in the drawing with the transparent belt 3 somewhat in the form of a T with a double stem. The other transparent belt 4, extends, during the part of its course marked a, in a U course, enclosing the double stem of the T of belt 3, and lies especially closely adjacent to the belt 3. The parts b, c, d, and e of these belts lie horizontally, and preferably also closely adjacent to each other, to hold firmly the document carried. The remaining portions of these belts are run, preferably so that they will not interfere with the entering or leaving of the document, or obstruct the photographing or the passage of the actuating beam of the photoelectric relay. Suitable guiding pulleys 10, 10, 10, control the course of these belts. The belt 1 carries the document into the bite of the belts 3 and 4. The documents may be discharged at the point B into a receptacle. The camera 5 may be of any continuous roll type. These types of cameras are used in making moving pictures, and are well known, and it is not necessary to describe them in detail particularly, as any practical form of moving picture camera will operate satisfactorily.

The camera is focussed upon a portion of the belts 3 and 4 where they will hold a document between them. I can regulate the timing at which the exposure shall begin and end and its duration in various ways, mechanically or electrically. In the preferred form of my device I lead from the relay the current to the coils 20, of the solenoid 21. The plunger 22 of which is lifted springingly by the spring 23, the tension of which may be regulated as by the nut 24, so that its response to the attraction of the solenoid will be synchronized with the snapping of the camera shutter and the positioning of the document in front of the camera. This can be done by a snap open and shut switch of the type described in Dennison Electrical Accessories 1922, published by Axel and Co. New York at page 127, see Figure 75, which are well known commercial devices. Any form of snap shutter may be employed.

This element which is shown particularly at the upper right hand portion of Fig. 5, may be briefly described as follows: A lever fulcrumed at 40, has an arm 25 engaging with and operated by the solenoid, and an arm 26 tripping another lever arm 27 fulcrumed at 41. The lever arm 27 is held springingly in position by springs 30 and 31 secured to abutments 32 and 33, so that it will lie in the path of the arm 26 and be tripped by it; 29 is a contact with which the lever arm 28 contacts momentarily when the tripping occurs. From the fulcrum pin 32 and the contact 40 run the wires 42 and 43 that actuate electrically the camera shutter. Electrical mechanism for operating the camera shutter and advancing the film are well known, and hence need not be described here. When the solenoid is reversed, (that is, when changed from an active to a passive state, or vice versa) causing the lever arm 25 to return to its original position, the arm 27 will be tripped in the opposite direction, and will not cause the arm 28 to touch the contact 29.

The current through the solenoid 21 is controlled by a photo-electric relay 15. A photo-electric relay is a well known device and consists essentially of three parts; the photo-tube, or light sensitive device; the system for amplifying the phototube current; and a relaying device that opens or closes the electric circuit that performs the desired operation. A form of photo-electric relay suitable for my device is explained in United States patent to Garret A. Hobart, No. 2,088,416 of July 27, 1937.

This photo-electric relay is placed so that the "eye" lies on one side of the T formed portions of the belts 3 and 4 and light source that actuates it on the other side of them, so that this light will pass through the belts 3 and 4, which preferably have a longitudinal slot g, to allow the freer passage of the actuating beam. The actuating beam for the photo-electric cell may advantageously be one having a low photographic actinity, such as a red ray. This ray or beam, is interrupted when the opaque document screens the relay from the light source. The beam between the light source and the photo-electric cell should pass through the transparent belts near where the camera is focussed on them. As the movements of the belts are rapid, the snap shots must be taken, in order to avoid blurring, nearly instantaneously, and the exposure must be for only a very small fraction of a second and must be timed to occur, as nearly as possible, when the document is precisely opposite the camera. Preferably, I incline the beam controlling the photo-electric cell so that it will cross the belt near where the document will lie when the exposure occurs. The cell and light furnishing its beam will cross diagonally the axis of the lens of the camera, preferably lying in the direction of the travel of the belt, so that the photocell beam will pass through the slot g. The rising and descending portions of the transparent belt should lie close enough so that when the focal distance of the lens of the camera is set between them, each position of the document will be close enough to it to give a sharp enough picture of the document. By making the axis of the photocell beam intersect the axis of the lens of the camera, between the positions assumed by the document for its front and reverse exposure, the photo-electric relay will operate when the edge of the document reaches this intersection and the exposure will occur almost immediately afterwards, and be over long before the document ceases to screen the cell beam. This beam can be red or otherwise nonactinic, so that it cannot, under any circumstances, affect the camera film.

The documents are laid on the feeding belt which carries them to the bite of the belts 3 and 4 which, moving more rapidly, space them. As a document passes in one direction on the path to pass in front of the camera, it passes in front of the "eye" of the photo-electric relay, and causes the relay to energize the solenoid, and, after a momentary delay, snap the camera shutter, so that the cameras will take the picture. The belt will continue the movement and when they pass over the pulley to reverse it, this reversed travel of the belts 3 and 4, will bring the reverse side of the document opposite the camera and also cause it to interrupt the actuating beam of the photo-electric cell again. A picture of the reverse side of the document is then obtained. The belts 3 and 4 then carry the document to the discharge point B, where it may be discharged into a suitable receptacle 30.

A modification is disclosed in Fig. 6, wherein the snap off and on switch is connected to a switch 50 that is in circuit with an electric light 70. This may be used in place of or in addition to the shutter control above described. If the elements are enclosed in a dark chamber, the shutter control may be omitted. I can use a powerful electric lamp 70, (which is provided with a reflector 8 and lens 9) collecting the light upon the document when it reaches a particular point in its travel. As the light of the lamp 70 will be extinguished except at the moment of exposure, the camera need not have a shutter, because there will be only a momentary flash of light given out by the lamp. The element producing the momentary lighting of the electric bulb 70 is, in many ways, similar to that producing the movement of the camera shutter, and is illustrated at Fig. 6. The lever arms 26 and 25 are fulcrumed at 40, and the arm 26 trips the arm 27 of the lever which is fulcrumed at 41, and its other arm 28 contacts with a contact 35, when the arm 27 is tripped, being springingly held in the path of the arm 26 by the springs 30 and 31 attached to it and to the abutments 32 and 33. The conductor 46 leads from the contact 35 to a terminal of the bulb 70 and conductor 47 runs through the source of energy 37 to the fulcrum 41 from the other terminal of the bulb.

Many changes may be made in the assemblage of devices by which the camera is operated synchronously with the passage of the document in front of it, while it is held by and between transparent belts that travel in front of it in opposite directions, bringing each side of the document successively in front of the camera.

These photo-electric relays are standard articles that vary in their construction and referring to the particular form is not to be taken as limiting my invention to the use of that form or a similar form, as many forms of photo-electric relays may be used, and my invention is not to be held to be limited to less than the claims.

I claim:

1. A device for photographing both sides of a check or similar document, by passing the said documents continuously before a camera that is made operative photographically, comprising a pair of transparent travelling belts lying against each other, travelling at substantially equal speed, and adapted to hold the document between them, positioned to travel twice in front of the camera, the direction of the said travel of the pair of belts before the camera, the second time, being in the opposite direction from the direction of their travel the first time, means for driving said belts, and means for making the camera photographically operative coincidentally with the arrival of the document held between the belts at a position to be photographed by it.

2. The device defined in claim 1 wherein the portions of the pair of transparent belts holding the document between them travel vertically at the points comprised in the pair separate from each other at another portion of their travel, thereby permitting the insertion and withdrawal of the documents into and from the holding of the belts.

3. A device for photographing both sides of a check or similar document, by passing the said documents consecutively before a camera that is made operative photographically interruptedly, comprising a pair of transparent travelling belts travelling at substantially equal speed with each other, lying against each other, and adapted to hold the document between them and positioned to pass in their travel twice in front of the camera, the direction of the second passage being opposite to the direction of the first passage, and means, containing a photo-electric relay operated by the passage of document cutting the operative ray of the relay, for making the relay cause the camera to operate temporarily photographically.

4. The device as defined in claim 3 wherein the path of the actuating ray of the photo-electric relay is intercepted by the document carried by the transparent belt when the document is opposite the camera.

5. The device as defined in claim 3 wherein the pair of transparent belts are slotted in the direction of their length, with a slot sufficiently wide for the passage of the actuating ray of the photo-electric relay, the eye of the relay and the source of the actuating ray being placed at opposite sides of the pair of belts and wherein the actuating ray of the photoelectric relay is intercepted by the document carried by the transparent belt when the document is opposite the camera.

6. A device for photographing, consecutively, both sides of a check or other document of like character, by passing consecutively, said documents before a camera that is made operative interruptedly, comprising a pair of transparent travelling belts, travelling at substantially equal speeds with each other, lying against each other, said pair having horizontally moving and vertically moving portions, and adapted to hold the document between them, a set of rollers carrying said belts, said set containing rollers extending said pair of belts horizontally, a pulley placed beneath the pair of belts at the points of change of direction between their vertically travelling and horizontally travelling portions, and a pulley placed at the bottom of the vertical travel of said pair of belts passing over the latter pulley and having the direction of their vertical movement reversed thereby.

FRANK D. POOLEY, Jr.